(12) United States Patent
Shi

(10) Patent No.: US 11,196,153 B1
(45) Date of Patent: Dec. 7, 2021

(54) EXPOSED PORTION OF A PRINTED CIRCUIT BOARD (PCB) CONFIGURED TO PROVIDE ISOLATION AMONG RADAR ANTENNAS

(71) Applicant: Aptiv Technologies Limited, St. Michael (BB)

(72) Inventor: Shawn Shi, Thousand Oaks, CA (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/995,748

(22) Filed: Aug. 17, 2020

(51) Int. Cl.
*H01Q 1/32* (2006.01)
*H01Q 23/00* (2006.01)
*H01Q 21/08* (2006.01)

(52) U.S. Cl.
CPC .......... *H01Q 1/3233* (2013.01); *H01Q 21/08* (2013.01); *H01Q 23/00* (2013.01)

(58) Field of Classification Search
CPC .......... H01Q 1/3233; H01Q 1/00; H01Q 1/08
See application file for complete search history.

(56) References Cited

U.S. PATENT DOCUMENTS

| | | | | |
|---|---|---|---|---|
| 5,977,924 A | * | 11/1999 | Takei | H01Q 21/068 343/700 MS |
| 6,198,434 B1 | * | 3/2001 | Martek | H01Q 3/40 342/373 |
| 6,583,760 B2 | * | 6/2003 | Martek | H01Q 1/523 342/373 |
| 9,917,355 B1 | * | 3/2018 | Lee | H01Q 1/38 |
| 2013/0169505 A1 | * | 7/2013 | Shmuel | H01Q 1/1235 343/848 |
| 2018/0026356 A1 | * | 1/2018 | Schmalenberg | H01Q 21/064 343/713 |
| 2019/0006743 A1 | * | 1/2019 | Kirino | H01P 5/12 |
| 2019/0288366 A1 | * | 9/2019 | Kirino | H01P 5/12 |
| 2019/0326686 A1 | * | 10/2019 | Yurievich | G01S 13/89 |
| 2020/0349545 A1 | * | 11/2020 | Moshe | G01S 7/03 |

\* cited by examiner

*Primary Examiner* — Lam T Mai
(74) *Attorney, Agent, or Firm* — Colby Nipper PLLC

(57) ABSTRACT

This document describes techniques and systems of an exposed portion of a PCB configured to provide isolation among radar antennas. The described radar system includes an exposed portion of a surface of a printed circuit board (PCB) positioned between a first antenna and a second antenna. The PCB includes a metal plating on the surface of the PCB. A width of the exposed portion can delay a phase of electromagnetic (EM) energy conducted by the metal plating relative to a phase of EM energy that does not traverse the exposed portion. A height of the exposed portion can cause an amount of the EM energy conducted by the metal plating to be approximately equal to an amount of EM energy that traverses the exposed portion. In this way, the described systems and techniques can reduce signal-coupling among radar antennas without additional hardware costs and distance between the antennas.

20 Claims, 5 Drawing Sheets

EXPOSED PORTION OF A PRINTED CIRCUIT BOARD (PCB) CONFIGURED TO PROVIDE ISOLATION AMONG RADAR ANTENNAS

BACKGROUND

Radar systems use electromagnetic signals to detect and track objects. The electromagnetic signals are transmitted and received using one or more antennas. In automotive applications, the antennas may be positioned tightly near one another for compactness or to achieve a particular radar effect. Signal-coupling can occur between two or more nearby antennas; a portion of the electromagnetic signals transmitted or received from one antenna couple with the electromagnetic signals received or transmitted by another antenna. Signal-coupling can induce a relatively large noise-floor in the radar system. It is desirable to reduce signal-coupling without introducing additional hardware, complexity, and/or cost, in particular, while maintaining a compact design.

SUMMARY

This document describes techniques and systems of an exposed portion of a printed circuit board (PCB) configured to provide isolation among radar antennas. For example, a radar system includes a printed circuit board (PCB) that includes a first antenna and a second antenna on a surface of the PCB. The first antenna and the second antenna are configured to emit or receive electromagnetic (EM) energy. The PCB also includes a metal plating on the surface of the PCB. The metal plating can conduct a portion of the EM energy from the first antenna on the surface of the PCB, and the second antenna can receive the portion of the EM energy conducted by the metal plating. An exposed portion of the PCB surface, which is positioned between the first antenna and the second antenna, represents an area of the surface of the PCB without the metal plating. A width of the exposed portion can delay a phase of a first part of the portion of the EM energy that traverses the exposed portion relative to a phase of a second part of the portion of the EM energy that does not traverse the exposed portion. A height of the exposed portion can cause an amount of energy of the first part of the portion of the EM energy to be approximately equal to an amount of energy of the second part of the portion of the EM energy.

This document also describes methods performed by the above-summarized system and other methods set forth herein, as well as means for performing these methods.

This Summary introduces simplified concepts related to an exposed portion of a PCB configured to provide isolation among radar antennas, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of one or more exposed portions of a PCB configured to provide isolation among radar antennas are described in this document with reference to the following figures. The same numbers are often used throughout the drawings to reference like features and components.

DETAILED DESCRIPTION

Overview

Radar systems are an important sensing technology that some automotive systems rely on to acquire information about the surrounding environment. Some radar systems include at least two antennas to transmit and receive EM radiation. For example, radar systems include at least one transmit antenna to emit EM radiation and at least one receive antenna to receive EM radiation that reflects off nearby objects. Signal-coupling among multiple radar antennas can introduce a relatively large noise floor into the radar system.

Some radar systems include a barrier wall or absorber between antennas to reduce signal-coupling between them. In addition to increasing the hardware cost of the radar system, a barrier wall or absorber can partially block the antennas' field of view.

Other radar systems increase the distance among the antennas. The increased distance generally does not significantly reduce the signal-coupling among the antennas and increases the size of the radar system. For many applications, including automotive applications, it is desirable to minimize the size of radar systems, and in particular, the size of their antennas.

In contrast, this document describes techniques and systems to isolate antennas in radar systems without additional hardware costs and complexities, or further distancing among the antennas. For example, a radar system can include an exposed portion of a surface of a PCB positioned between a first antenna and a second antenna. The PCB includes a metal plating on the surface of the PCB. A width of the exposed portion can delay a phase of EM energy conducted by the metal plating relative to a phase of EM energy that does not traverse the exposed portion. The height of the exposed portion can cause an amount of the EM energy conducted by the metal plating to be approximately equal to an amount of EM energy that traverses the exposed portion. In this way, the described systems and techniques can reduce signal-coupling among radar antennas without a barrier wall or increasing the size of the radar system.

This is just one example of the described techniques and systems of an exposed portion of a PCB configured to provide isolation among radar antennas. This document describes other examples and implementations.

Operating Environment

Figure 1:
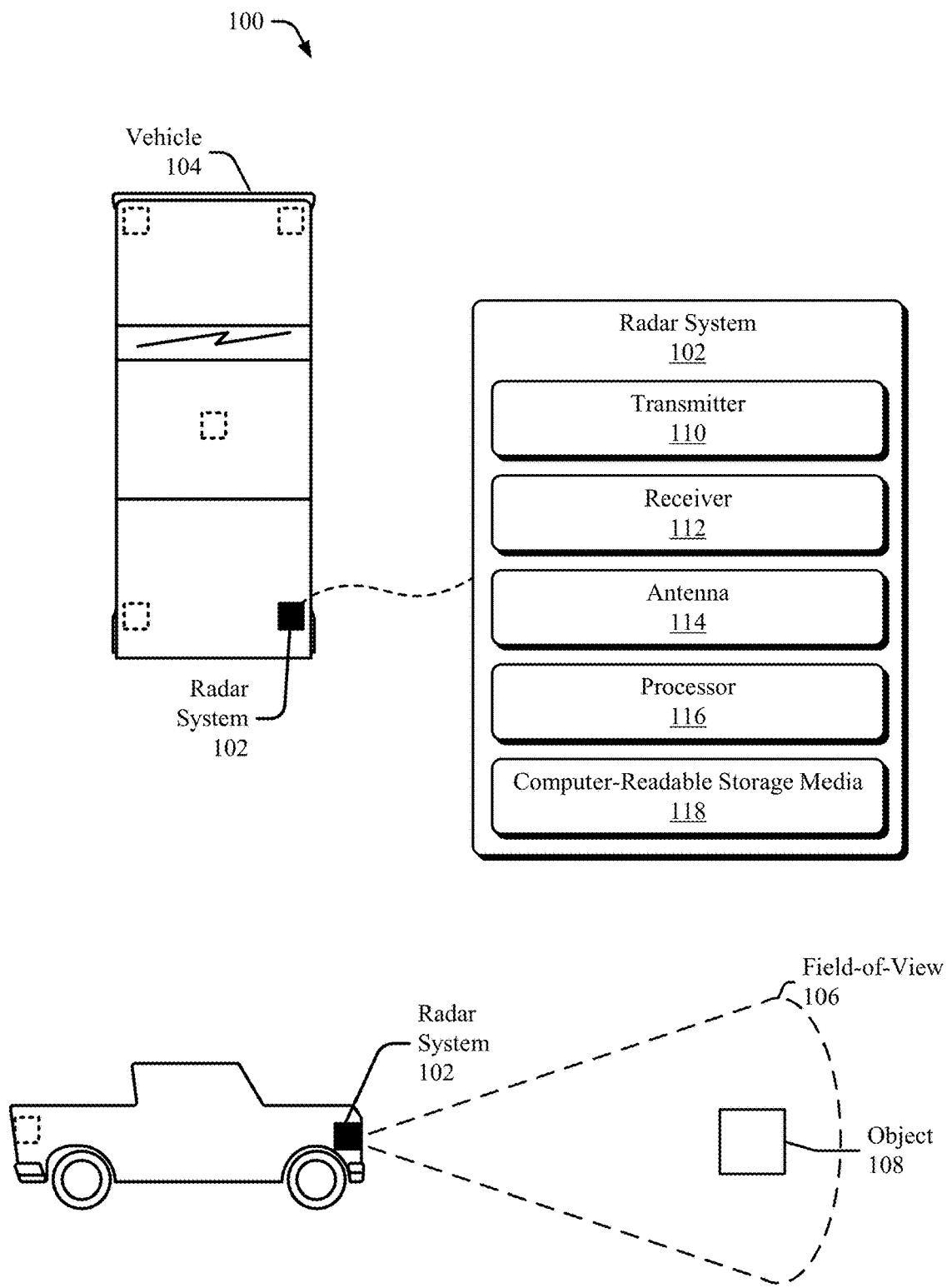
FIG. 1 illustrates an example environment in which a radar system with one or more exposed portions of a PCB configured to provide isolation among radar antennas can be implemented.

FIG. 1 illustrates an example environment 100 in which a radar system 102 with one or more an exposed portion of a PCB configured to provide isolation among radar antennas can be implemented. In the depicted environment 100, the radar system 102 is mounted to, or integrated within, a vehicle 104. The radar system 102 is capable of detecting one or more objects 108 that are in proximity to the vehicle 104. Although illustrated as a car, the vehicle 104 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment.

In the depicted implementation, the radar system 102 is mounted on the front of the vehicle 104 and provides a field-of-view 106 illuminating the one or more objects 108. The radar system 102 can project the field-of-view 106 from any exterior surface of the vehicle 104. For example, vehicle manufacturers can integrate the radar system 102 into a bumper, side mirror, headlights, rear lights, or any other interior or exterior location where the object 108 requires detection. In some cases, the vehicle 104 includes multiple radar systems 102, such as a first radar system 102 and a second radar system 102 that together provide a larger field-of-view 106. In general, vehicle manufacturers can design the locations of the one or more radar systems 102 to provide a particular field-of-view 106 that encompasses a region of interest in which the object 108 may be present. Example fields-of-view 106 include a 360-degree field-of-view, one or more 180-degree fields-of-view, one or more 90-degree fields-of-view, and so forth, which can overlap or be combined into a field-of-view 106 of a particular size.

The object 108 is composed of one or more materials that reflect radar signals. Depending on the application, the object 108 can represent a target of interest. In some cases, the object 108 can be a moving object or a stationary object. The stationary objects can be continuous (e.g., a concrete barrier, a guard rail) or discontinuous (e.g., a traffic cone) along a portion of the road.

The radar system 102 emits electromagnetic radiation by transmitting one or more electromagnetic signals or waveforms via active elements. In the environment 100, the radar system 102 can detect and track the object 108 by transmitting and receiving one or more radar signals. As an example, the radar system 102 can transmit electromagnetic signals between 100 and 400 gigahertz (GHz), between 4 and 100 GHz, or between approximately 70 and 80 GHz.

The radar system 102 can determine a distance to the object 108 based on the time it takes for the signals to travel from the radar system 102 to the object 108, and from the object 108 back to the radar system 102. The radar system 102 can also determine a location of the object 108 in terms of an angle based on the direction of a maximum amplitude echo signal received by the radar system 102.

The radar system 102 can be part of the vehicle 104. The vehicle 104 can also include at least one automotive system that relies on data from the radar system 102, including a driver-assistance system, an autonomous-driving system, or a semi-autonomous-driving system. The radar system 102 can include an interface to the at least one automotive system, wherein the antenna 114 can output, via the interface, a signal based on EM energy received by the antenna 114.

Generally, the automotive systems use radar data provided by the radar system 102 to perform a function. For example, the driver-assistance system can provide blind-spot monitoring and generate an alert that indicates a potential collision with the object 108 that is detected by the radar system 102. In this case, the radar data from the radar system 102 indicates when it is safe or unsafe to change lanes. The autonomous-driving system may move the vehicle 104 to a particular location on the road while avoiding collisions with the object 108 detected by the radar system 102. The radar data provided by the radar system 102 can provide information about a distance to and the location of the object 108 to enable the autonomous-driving system to perform emergency braking, perform a lane change, or adjust the speed of the vehicle 104.

The radar system 102 includes a transmitter 110 and at least one antenna 114 to transmit electromagnetic signals, and a receiver 112 and the at least one antenna 114 to receive reflected versions of these electromagnetic signals. The transmitter 110 includes components for emitting electromagnetic signals. The receiver 112 includes one or more components to detect the reflected electromagnetic signals. The transmitter 110 and the receiver 112 can be incorporated together on the same integrated circuit (e.g., a transceiver integrated circuit) or separately on different integrated circuits.

The radar system 102 also includes one or more processors 116 (e.g., an energy processing unit) and computer-readable storage media (CRM) 118. The processor 116 can be implemented as a microprocessor or a system-on-chip. The processor 116 executes instructions that are stored within the CRM 118. As an example, the processor 116 can process EM energy received by the antenna 114 and determine a location of the object 108 relative to the radar system 102. The processor 116 can also generate radar data for the automotive systems. As an example, the processor 116 can control, based on processed EM energy from the antenna 114, an autonomous or semi-autonomous driving system of the vehicle 104.

Figure 2:
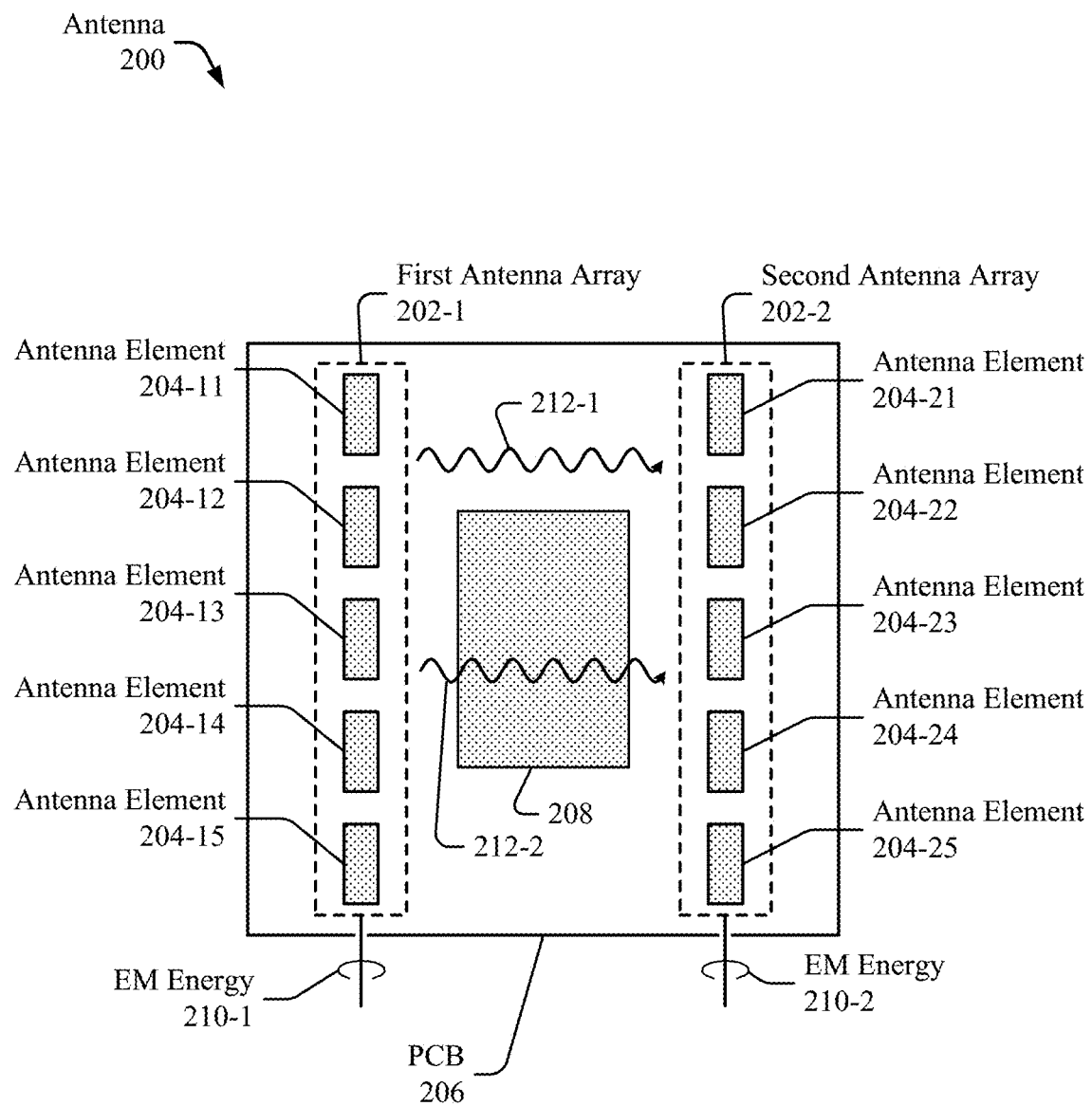
FIG. 2 illustrates an example antenna with a window for isolation among antenna arrays.

FIG. 2 illustrates an example antenna 200 with a window 208 for isolation among antenna arrays. The antenna 200 includes a first antenna array 202-1 and a second antenna array 202-2 on a PCB 206. The PCB 206 includes a metal plating (e.g., copper alloy) on a top and/or bottom surface.

The first antenna array 202-1 and the second antenna array 202-2 are configured to emit or receive electromagnetic energy. For example, the first antenna array 202-1 and the second antenna array 202-2 can be a transmit antenna array and a receive antenna array, respectively. In some implementations, the first antenna array 202-1 and the second antenna array 202-2 can be two transmit antenna arrays or two receive antenna arrays. In other implementations, the antenna 200 can include additional antenna arrays 202 with at least one window 208 located between the antenna arrays 202.

The first antenna array 202-1 and the second antenna array 202-2 include multiple antenna elements 204. The antenna arrays 202 can be planar arrays that provide high gain and low loss. Planar arrays are well-suited for vehicle integration due to their small size and depth. For example, the antenna elements 204 of the antenna arrays 202 can be slots etched or otherwise formed in the plating material of one surface of the PCB 206 for a substrate-integrated waveguide (SIW) antenna. The antenna elements 204 can also include elements of an aperture antenna, a microstrip antenna, or a dipole antenna. As an example, the antenna arrays 202 can include subarrays of patch elements (e.g., microstrip patch antenna subarrays) or dipole elements.

In the depicted implementation, the first antenna array 202-1 includes five antenna elements, including an antenna element 204-11, an antenna element 204-12, an antenna element 204-13, an antenna element 204-14, and an antenna element 204-15. The second antenna array 202-2 also includes five antenna elements, including an antenna element 204-21, an antenna element 204-22, an antenna element 204-23, an antenna element 204-24, and an antenna element 204-25. In other implementations, the first antenna array 202-1 and/or the second antenna array 202-2 can include fewer or additional antenna elements 204, including a single antenna element 204.

In operation, the first antenna array 202-1 can transmit or receive electromagnetic energy 210-1. The metal plating on the surface of the PCB 206 can conduct a portion of the EM energy 212 from the first antenna array 202-1 along the surface of the PCB 206. The second antenna array 202-2 can receive the portion of the EM energy 212 conducted by the metal plating. The second antenna array 202-2 couples the portion of the EM energy 212 with EM energy 210-2, which is emitted or received by the second antenna array 202-2.

As an example, the first antenna array 202-1 can be a transmit antenna array and the second antenna array 202-2 can be a receive antenna array. When the first antenna array 202-1 emits the EM energy 210-1, a relatively large portion of the EM energy 210-1 is radiated perpendicular to the surface of the PCB 206 to illuminate potential targets within the field-of-view 106 of the radar system 102. The metal plating also conducts a portion of the EM energy 212 along the surface of the PCB 206. The second antenna array 202-2 can couple the portion of the EM energy 212 with the received EM energy 210-2. This coupling can cause a relatively high noise floor (e.g., coupling noise) in the EM energy output by the second antenna array 202-2.

The at least one window 208 represents an exposed portion of the surface of the PCB 206 without the metal plating. It is also referred to as simply "the window 208" because the portion can be exposed in various ways, not only through etching. The window 208 is configured to act as a ground point or ground window on the surface of the PCB 206. For example, the window 208 can represent a portion of the metal plating removed or etched away from the surface of the PCB 206. As another example, the window 208 can represent a portion of the surface of the PCB 206 masked during the metal-plating process for the PCB 206. In this way, the surface of the PCB 206 includes an omitted region of metal plating, wherein the omitted region of metal plating represents the window 208.

The window 208 is positioned between the first antenna array 202-1 and the second antenna array 202-2. The window 208 can generally be positioned anywhere along the coupling path between the first antenna array 202-1 and the second antenna array 202-2. A height of the window 208 is generally less than a height of the first antenna array 202-1 and/or a height of the second antenna array 202-2. As a result, a first part 212-1 of the portion of the EM energy 212 does not traverse the window 208, and a second part 212-2 of the portion of the EM energy 212 does traverse the window 208.

A width of the window 208 is effective in delaying a phase of the second part 212-2 of the portion of the EM energy 212 relative to a phase of the first part 212-1 of the portion of the EM energy 212. The phase of the first part 212-1 of the portion of the EM energy 212 is delayed due to effects from the dielectric constant of the PCB substrate (e.g., slow-wave effect). The width of the window 208 can be sufficient to cause the phase of the second part 212-2 of the portion of the EM energy 212 to be delayed by approximately 180 degrees relative to the phase of the first part 212-1 of the portion of the EM energy 212. The width of the window 208 can be determined from simulations, empirical analysis, or a combination thereof.

A height of the window 208 is effective to cause an amount of energy of the second part 212-2 of the portion of the EM energy 212 to be approximately equal to an amount of energy of the first part 212-1 of the portion of the EM energy 212. In this way, when the portion of the EM energy 212 is coupled in the second antenna array 202-2, the width and the height of the window 208 can be effective to minimize, or even approximately eliminate, the first part 212-1 against the second part 212-2 of the portion of the EM energy 212. As a result, the coupling noise at the second antenna array 202-2 can be minimized or approximately eliminated.

Figure 3:
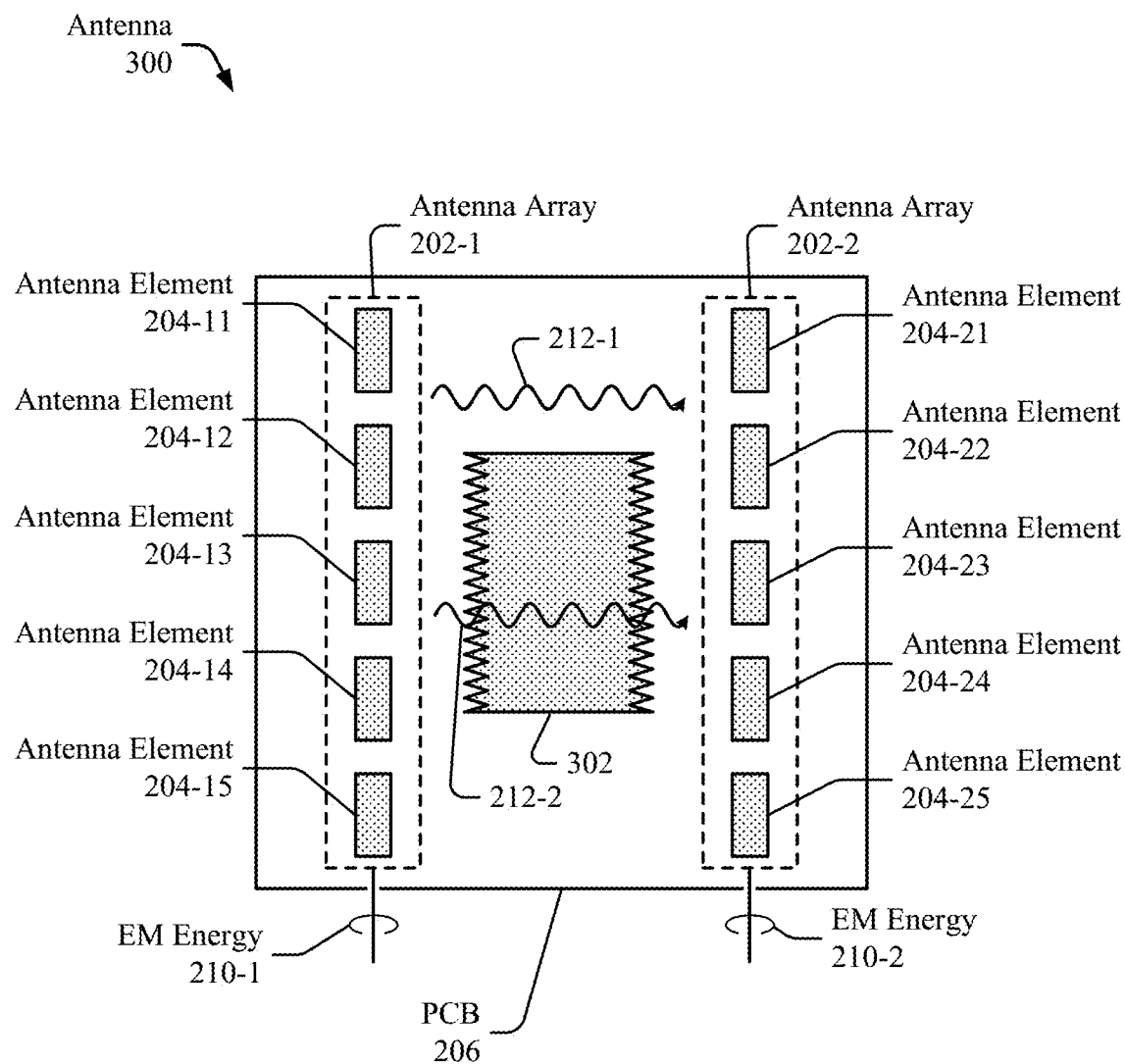
FIG. 3 illustrates another example antenna with a window for isolation among antenna arrays.

FIG. 3 illustrates another example antenna 300 with a window 302 for isolation among antenna arrays. The antenna 300 is similar to the antenna 200 of FIG. 2, with many of the same or similar components. The antenna 300 includes the first antenna array 202-1 and the second antenna array 202-2 on the PCB 206.

Similar to the antenna 200 of FIG. 2, the first antenna array 202-1 of the antenna 300 can transmit or receive electromagnetic energy 210-1. The metal plating on the surface of the PCB 206 can conduct a portion of the EM energy 212 from the first antenna array 202-1 along the surface of the PCB 206. The second antenna array 202-2 can receive the portion of the EM energy 212 conducted by the metal plating. The second antenna array 202-2 couples the portion of the EM energy 212 with EM energy 210-2, which is emitted or received by the second antenna array 202-2.

Similar to the window 208 of FIG. 2, the window 302 of the antenna 300 represents an exposed portion of the surface of the PCB 206 without the metal plating. The window 302 can include an irregular surface on opposite sides of the window 302 positioned adjacently to the first antenna array 202-1 and the second antenna array 202-2. In some examples, the irregular surface can include individual peaks and valleys arranged like teeth (e.g., a sawtooth). The irregular surface of the window 302 can minimize or avoid edge scattering of the second part 212-2 of the portion of the EM energy 212 that traverses the window 302 at the sides of the window 302. In other implementations, the sides of the window 302 can be curved down toward the PCB substrate to minimize edge scattering.

Figure 4:
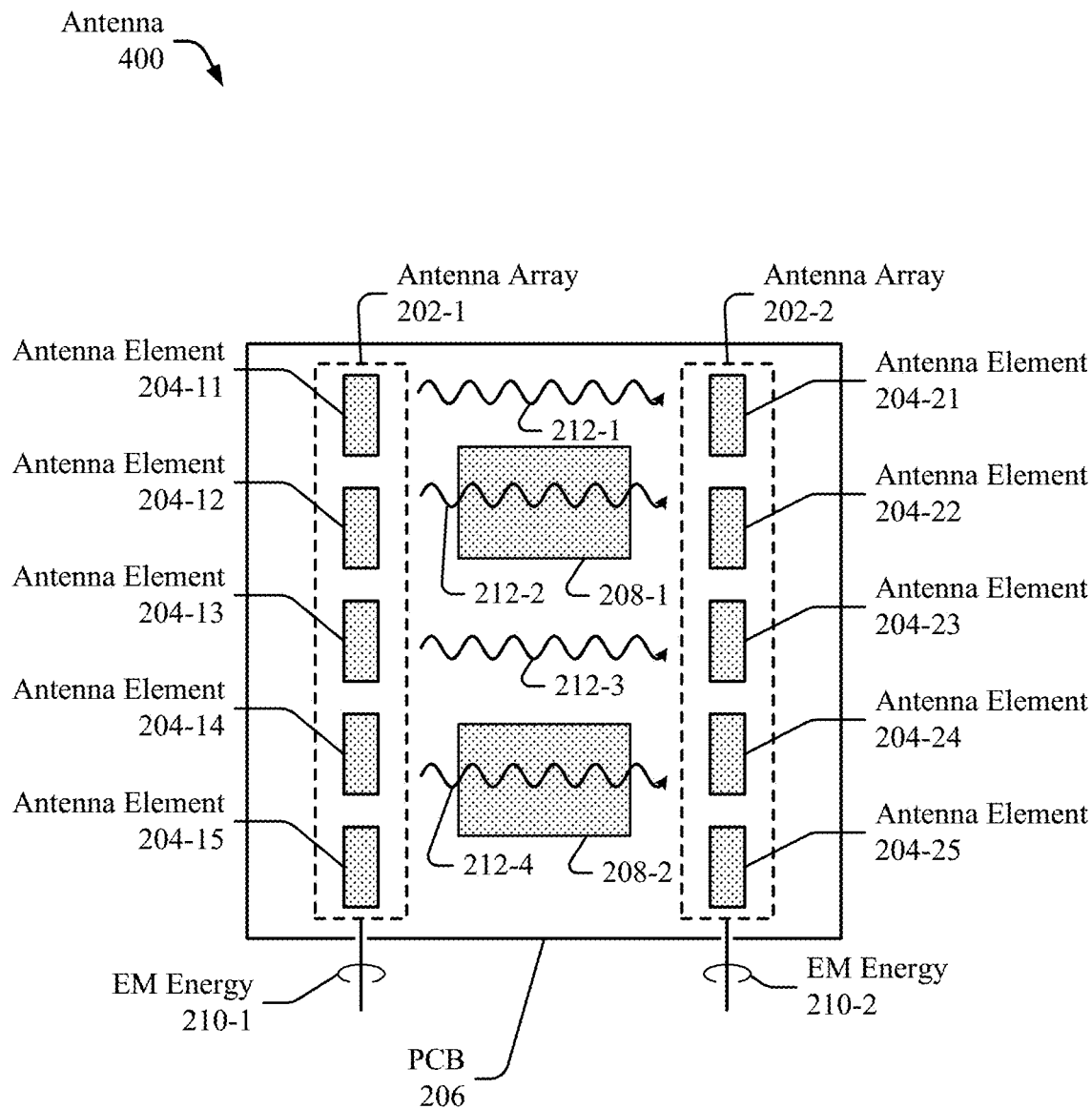
FIG. 4 illustrates an example antenna with multiple windows for isolation among antenna arrays.

FIG. 4 illustrates an example antenna 400 with multiple windows 208 for isolation among antenna arrays. The antenna 400 is similar to the antenna 200 of FIG. 2, with many of the same or similar components. The antenna 400 includes the first antenna array 202-1 and the second antenna array 202-2 on the PCB 206.

Similar to the antenna 200 of FIG. 2, the first antenna array 202-1 of the antenna 300 can transmit or receive electromagnetic energy 210-1. The metal plating on the surface of the PCB 206 can conduct a portion of the EM energy 212 from the first antenna array 202-1 along the surface of the PCB 206. The second antenna array 202-2 can receive the portion of the EM energy 212 conducted by the metal plating. The second antenna array 202-2 couples the portion of the EM energy 212 with EM energy 210-2, which is emitted or received by the second antenna array 202-2.

The antenna 400 includes a first window 208-1 and a second window 208-2. In other implementations, the antenna 400 can include additional windows 208. Similar to the window 208 of FIG. 2, the first window 208-1 and the second window 208-2 of the antenna 400 represents an exposed portion of the surface of the PCB 206 without the metal plating.

The first window 208-1 and the second window 208-2 are positioned between the first antenna array 202-1 and the second antenna array 202-2. The first window 208-1 and the second window 208-2 can be positioned generally anywhere along the coupling path between first antenna array 202-1 and the second antenna array 202-2.

A width of the first window 208-1 and the second window 208-2 is effective to delay a phase of the second parts 212-2 and 212-4 of the portion of the EM energy 212 relative to a phase of the first parts 212-1 and 212-3 of the portion of the EM energy 212. The width of the first window 208-1 is generally equal or approximately equal to the width of the second window 208-2.

A collective height of the first window 208-1 and the second window 208-2 is effective to cause an amount of energy of the second parts 212-2 and 212-4 of the portion of the EM energy 212 to be approximately equal to an amount of energy of the first parts 212-1 and 212-3 of the portion of the EM energy 212. In this way, when the portion of the EM energy 212 is coupled in the second antenna array 202-2, the width and the collective height of the first window 208-1 and the second window 208-2 can be effective to minimize, or even cancel, the first parts 212-1 and 212-3 against the second parts 212-2 and 212-4 of the portion of the EM energy 212.

In the depicted implementation, the first window 208-1 and the second window 208-2 have a rectangular shape or an approximately rectangular shape. As a result, the first antenna array 202-1 is positioned adjacently to a first side of the first window 208-1 and the second window 208-2 and the second antenna array 202-2 is positioned adjacently to a second side of the first window 208-1 and the second window 208-2 opposed the first side. In other implementations, the window 208 of FIG. 2, the window 302 of FIG. 3, the first window 208-1 of FIG. 4, and the second window 208-2 of FIG. 4 can have a different shape. A width and height of the window(s) can be determined using simulations or empirical analysis to minimize or cancel the first part 212-1 of the portion of the EM energy 212 against the second part 212-2 of the portion of the EM energy 212.

Example Method

Figure 5:
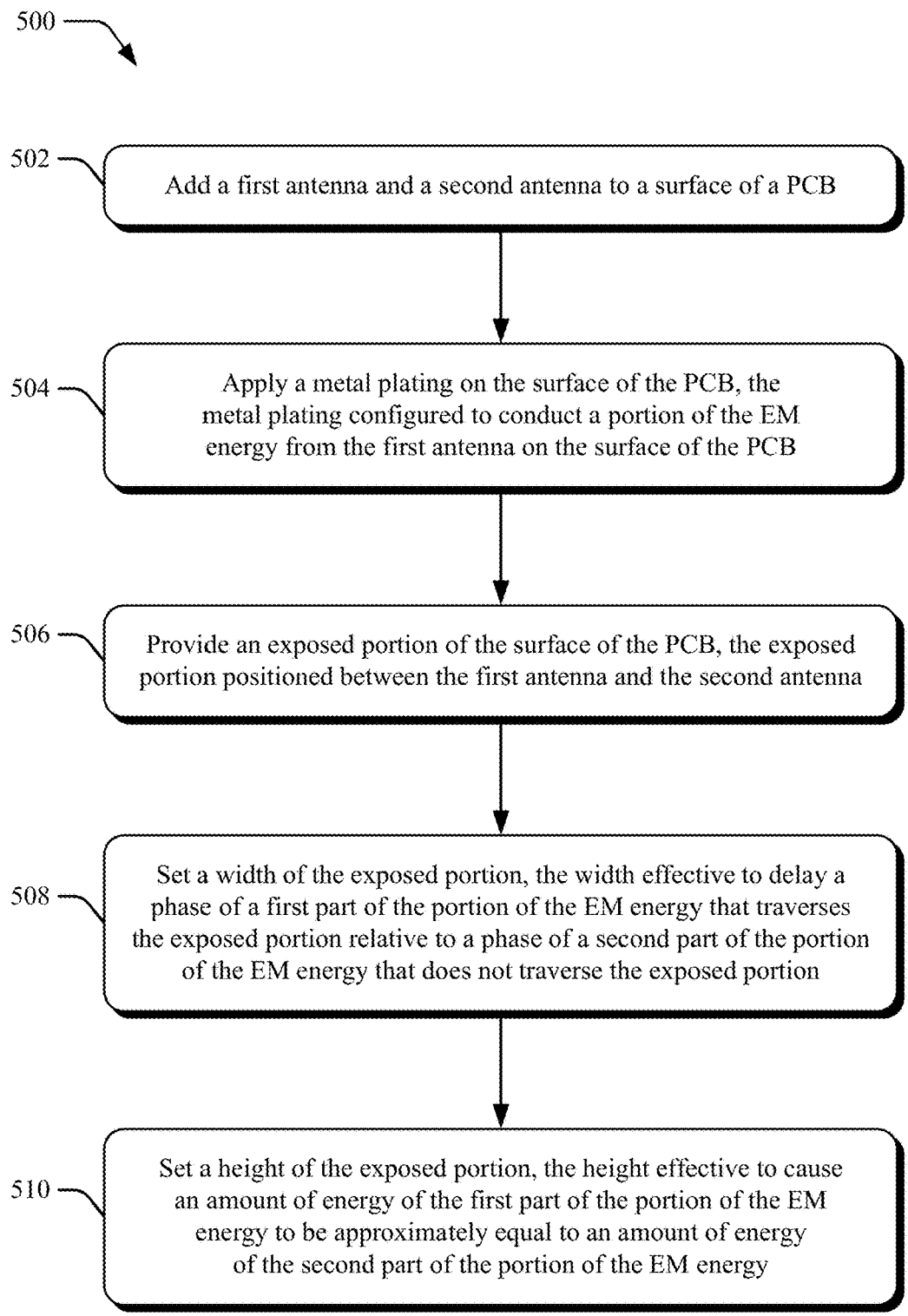
FIG. 5 illustrates an example method of an exposed portion of a PCB configured to provide isolation among radar antennas.

FIG. 5 depicts an example method 500 of an exposed portion of a PCB configured to provide isolation among radar antennas. Method 500 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 4, reference to which is made for example only. The techniques are not limited to performance by one entity or multiple entities.

At 502, a first antenna and a second antenna are added to a surface of a PCB. For example, the first antenna array 202-1 and a second antenna array 202-2 are added to a surface of the PCB 206.

At 504, a metal plating is applied to the surface of the PCB. The metal plating is configured to conduct a portion of the EM energy from the first antenna on the surface of the PCB. For example, a metal plating is applied to the surface of the PCB 206. The metal plating conducts a portion of the EM energy 212 from the first antenna array 202-1 on the surface of the PCB 206. The second antenna array 202 is configured to receive the portion of the EM energy 212 and is coupled with the EM energy 210-2.

At 506, an exposed portion of the surface of the PCB is provided. The exposed portion is positioned between the first antenna and the second antenna. For example, a window 208 is provided on the surface of the PCB 206 and represents an exposed portion of the surface of the PCB 206. The window 208 is positioned between the first antenna array 202-1 and the second antenna array 202-2.

At 508, a width of the exposed portion is set. The width is effective to delay a phase of a first part of the portion of the EM energy that traverses the exposed portion relative to a phase of a second part of the portion of the EM energy that does not traverse the exposed portion. For example, the width of the window 208 is set. The width of the window 208 is effective to delay a phase of the second part 212-2 of the portion of the EM energy that traverses the window 208 relative to the phase of the first part 212-1 of the portion of the EM energy that does not traverse the window 208.

At 510, a height of the exposed portion is set. The height is effective to cause an amount of energy of the first part of the portion of the EM energy to be approximately equal to an amount of energy of the second part of the portion of the EM energy. For example, the height of the window 208 is set. The height of the window 208 is effective to cause the amount of energy of the first part 212-1 of the portion of the EM energy to be approximately equal to the amount of energy of the second part 212-2 of the portion of the EM energy.

EXAMPLES

In the following section, examples are provided.

Example 1: A radar system comprising: a printed circuit board (PCB) comprising: a first antenna and a second antenna on a surface of the PCB, the first antenna and the second antenna configured to emit or receive electromagnetic (EM) energy; a metal plating on the surface of the PCB, the metal plating configured to conduct a portion of the EM energy from the first antenna on the surface of the PCB, the second antenna configured to receive the portion of the EM energy conducted by the metal plating; and an exposed portion of the surface of the PCB, the exposed portion positioned between the first antenna and the second antenna and representing an area of the surface of the PCB without the metal plating, wherein: a width of the exposed portion is effective to delay a phase of a first part of the portion of the EM energy that traverses the exposed portion relative to a phase of a second part of the portion of the EM energy that does not traverse the exposed portion; and a height of the exposed portion is effective to cause an amount of energy of the first part of the portion of the EM energy to be approximately equal to an amount of energy of the second part of the portion of the EM energy.

Example 2: The radar system of example 1, wherein the width of the exposed portion is effective to delay the phase of the first part of the portion of the EM energy by approximately 180 degrees relative to the phase of the second part of the portion of the EM energy.

Example 3: The radar system of example 2, wherein the portion of the EM energy represents a coupling noise at the second antenna, and the width and the height of the exposed portion are further effective to approximately eliminate the coupling noise.

Example 4: The radar system of example 1, wherein the exposed portion has an approximately rectangular shape.

Example 5: The radar system of example 4, wherein the first antenna is positioned adjacently to a first side of the approximately rectangular shape and the second antenna is positioned adjacently to a second side of the approximately rectangular shape opposite the first side.

Example 6: The radar system of example 1, wherein a first side of the exposed portion adjacent the first antenna and a second side of the exposed portion opposite the first side include an irregular surface.

Example 7: The radar system of example 1, wherein the exposed portion comprises multiple exposed portions positioned between the first antenna and the second antenna.

Example 8: The radar system of example 1, wherein the first antenna and the second antenna comprise a first antenna array and a second antenna array, respectively.

Example 9: The radar system of example 8, wherein the first antenna array and the second antenna array comprise substrate-integrated waveguide (SIW) antennas.

Example 10: The radar system of example 1, wherein the first antenna comprises a transmit antenna and the second antenna comprises a receive antenna.

Example 11: The radar system of example 1, wherein the first antenna and the second antenna comprise two transmit antennas or two receive antennas.

Example 12: The radar system of example 1, wherein the first antenna and the second antenna comprise at least one of an aperture antenna, a microstrip antenna, and a dipole antenna.

Example 13: The radar system of example 10, the radar system further comprising an interface between the PCB and an automotive system of an automobile, wherein the PCB is configured to output, via the interface, a signal based on the EM energy received by the second antenna.

Example 14: The radar system of example 1, wherein the area of the surface of the PCB represents a portion of the metal plating etched from the surface of the PCB.

Example 15: The radar system of example 1, wherein the radar system is configured to be mounted to an automobile.

Example 16: The radar system of example 1, the radar system further comprising: an energy processing unit configured to process EM energy, including the portion of the EM energy, received by the second antenna, wherein the first part of the portion of the EM energy and the second part of the portion of the EM energy approximately cancel one another.

Example 17: The radar system of example 16, wherein the processor is further configured to control, based on the processed EM energy, an autonomous or semi-autonomous driving system of an automobile.

Example 18: A method of manufacturing a radar system comprising: adding a first antenna and a second antenna to a surface of a printed circuit board (PCB), the first antenna and the second antenna configured to emit or receive electromagnetic (EM) energy; applying a metal plating on the surface of the PCB, the metal plating configured to conduct a portion of the EM energy from the first antenna on the surface of the PCB, the second antenna configured to receive the portion of the EM energy conducted by the metal plating; and providing an exposed portion of the surface of the PCB, the exposed portion positioned between the first antenna and the second antenna and representing an area of the surface of the PCB without the metal plating, wherein: a width of the exposed portion is effective to delay a phase of a first part of the portion of the EM energy that traverses the exposed portion relative to a phase of a second part of the portion of the EM energy that does not traverse the exposed portion; and a height of the exposed portion is effective to cause an amount of energy of the first part of the portion of the EM energy to be approximately equal to an amount of energy of the second part of the portion of the EM energy.

Example 19: The method of example 18, wherein providing the exposed portion of the surface of the PCB comprises removing a portion of the metal plating on the surface of the PCB.

Example 20: The method of example 18, wherein applying the metal plating on the surface of the PCB comprises applying the metal plating to the surface of the PCB with an omitted region of metal plating, the omitted region of metal plating representing the exposed portion of the surface of the PCB.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A radar system comprising:
a printed circuit board (PCB) comprising:
   a first antenna and a second antenna on a surface of the PCB, the first antenna and the second antenna configured to emit or receive electromagnetic (EM) energy;
   a metal plating on the surface of the PCB, the metal plating configured to conduct a portion of the EM energy from the first antenna on the surface of the PCB, the second antenna configured to receive the portion of the EM energy conducted by the metal plating; and
   an exposed portion of the surface of the PCB, the exposed portion positioned between the first antenna and the second antenna and representing an area of the surface of the PCB without the metal plating, wherein:
      a width of the exposed portion is effective to delay a phase of a first part of the portion of the EM energy that traverses the exposed portion relative to a phase of a second part of the portion of the EM energy that does not traverse the exposed portion; and
      a height of the exposed portion is effective to cause an amount of energy of the first part of the portion of the EM energy to be approximately equal to an amount of energy of the second part of the portion of the EM energy.

2. The radar system of claim 1, wherein the width of the exposed portion is effective to delay the phase of the first part of the portion of the EM energy by approximately 180 degrees relative to the phase of the second part of the portion of the EM energy.

3. The radar system of claim 2, wherein the portion of the EM energy represents a coupling noise at the second antenna, and the width and the height of the exposed portion are further effective to approximately eliminate the coupling noise.

4. The radar system of claim 1, wherein the exposed portion has an approximately rectangular shape.

5. The radar system of claim 4, wherein the first antenna is positioned adjacently to a first side of the approximately rectangular shape and the second antenna is positioned adjacently to a second side of the approximately rectangular shape opposite the first side.

6. The radar system of claim 1, wherein a first side of the exposed portion adjacent the first antenna and a second side of the exposed portion opposite the first side include an irregular surface.

7. The radar system of claim 1, wherein the exposed portion comprises multiple exposed portions positioned between the first antenna and the second antenna.

8. The radar system of claim 1, wherein the first antenna and the second antenna comprise a first antenna array and a second antenna array, respectively.

9. The radar system of claim 8, wherein the first antenna array and the second antenna array comprise substrate-integrated waveguide (SIW) antennas.

10. The radar system of claim 1, wherein the first antenna comprises a transmit antenna and the second antenna comprises a receive antenna.

11. The radar system of claim 1, wherein the first antenna and the second antenna comprise two transmit antennas or two receive antennas.

12. The radar system of claim 1, wherein the first antenna and the second antenna comprise at least one of an aperture antenna, a microstrip antenna, and a dipole antenna.

13. The radar system of claim 10, the radar system further comprising an interface between the PCB and an automotive system of an automobile, wherein the PCB is configured to output, via the interface, a signal based on the EM energy received by the second antenna.

14. The radar system of claim 1, wherein the area of the surface of the PCB represents a portion of the metal plating etched from the surface of the PCB.

15. The radar system of claim 1, wherein the radar system is configured to be mounted to an automobile.

16. The radar system of claim 1, the radar system further comprising:
   an energy processing unit configured to process EM energy, including the portion of the EM energy, received by the second antenna, wherein the first part of the portion of the EM energy and the second part of the portion of the EM energy approximately cancel one another.

17. The radar system of claim 16, wherein the processor is further configured to control, based on the processed EM energy, an autonomous or semi-autonomous driving system of an automobile.

18. A method of manufacturing a radar system comprising:
   adding a first antenna and a second antenna to a surface of a printed circuit board (PCB), the first antenna and the second antenna configured to emit or receive electromagnetic (EM) energy;
   applying a metal plating on the surface of the PCB, the metal plating configured to conduct a portion of the EM energy from the first antenna on the surface of the PCB, the second antenna configured to receive the portion of the EM energy conducted by the metal plating; and
   providing an exposed portion of the surface of the PCB, the exposed portion positioned between the first antenna and the second antenna and representing an area of the surface of the PCB without the metal plating, wherein:
      a width of the exposed portion is effective to delay a phase of a first part of the portion of the EM energy that traverses the exposed portion relative to a phase of a second part of the portion of the EM energy that does not traverse the exposed portion; and
      a height of the exposed portion is effective to cause an amount of energy of the first part of the portion of the EM energy to be approximately equal to an amount of energy of the second part of the portion of the EM energy.

19. The method of claim 18, wherein providing the exposed portion of the surface of the PCB comprises removing a portion of the metal plating on the surface of the PCB.

20. The method of claim 18, wherein applying the metal plating on the surface of the PCB comprises applying the metal plating to the surface of the PCB with an omitted region of metal plating, the omitted region of metal plating representing the exposed portion of the surface of the PCB.

* * * * *